United States Patent Office 3,360,982
Patented Jan. 2, 1968

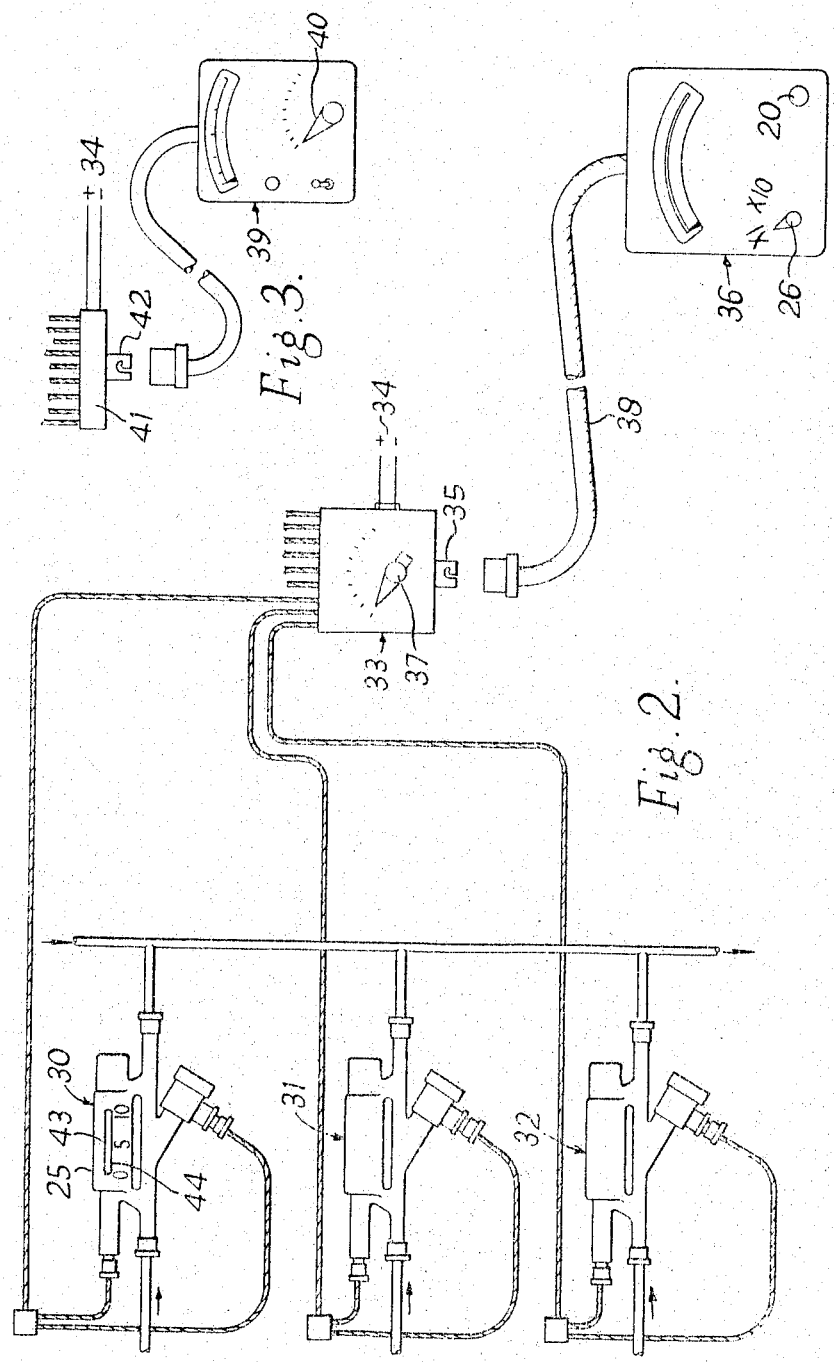

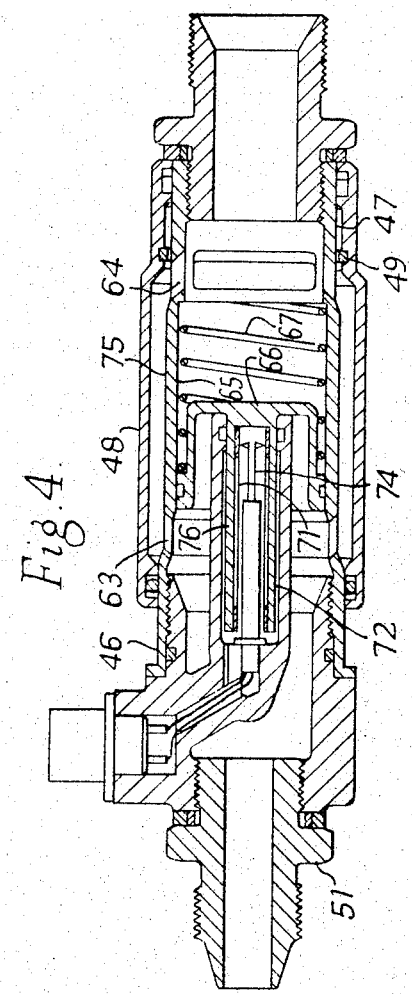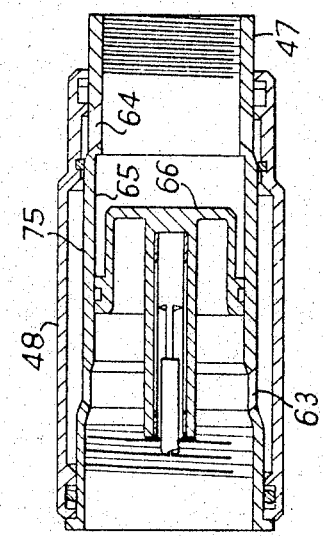

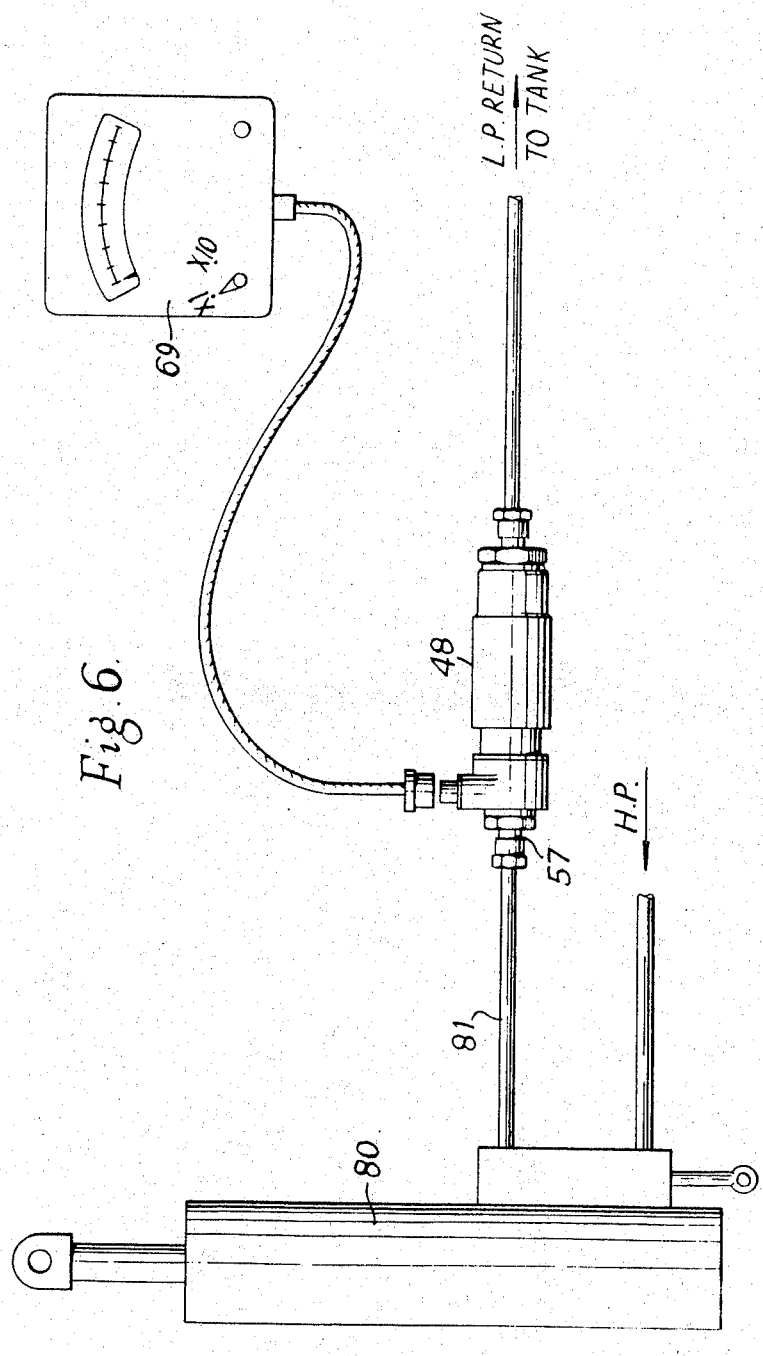

3,360,982
APPARATUS FOR CHECKING THE SEALING CONDITION OF HYDRAULIC PISTONS AND THE LIKE
Albert H. Mitchell and Peter B. Kahn, Fareham, England, assignors to The Plessey Company Limited, Ilford, England, a British company
Filed Apr. 19, 1966, Ser. No. 543,631
Claims priority, application Great Britain, Apr. 30, 1965, 18,278/65; July 16, 1965, 30,406/65
2 Claims. (Cl. 73—40)

ABSTRACT OF THE DISCLOSURE

A valve in a leak-flow escape line is temporarily closed by a solenoid to divert the leak flow to pass through a branch line, thus causing a piston in the branch line to "make" and "break" an electrical circuit to start and stop at predetermined points of the piston, a constant-speed indicating needle, which will thus travel over a total distance inversely proportional to the leak-flow rate.

---

This invention relates to hydraulic apparatus employing sliding seals, for example positive-displacement motors including a piston, and it has for an object to provide a device which permits the condition of the seal to be readily checked. The device may also be used to determine leakage past sealing fluids in static systems in which the sealing glands separate two parts of the system in which different pressures prevail.

Provision of such a device is particularly desirable in aircraft hydraulic systems, since in these it is desirable to ascertain by a check before each flight whether the numerous jacks, motors and other movable apparatus of the hydraulic system can be expected to operate reliably, and it is a more specific object of the present invention to provide the possibility of readily effecting such a check when the apparatus is pressurised but not operating.

According to the invention an outlet line for fluid from the low-pressure side of the seal is arranged to include a volumetric metering device, preferably a cylinder containing a metering piston or a receptacle divided by a metering diaphragm, which is bypassed by a passage containing a normally open stop valve, so that the rate of leak flow from the seal can be measured by closing the stop valve for a limited period of time and determining the amount of flow entering the volumetric metering device during a measured part of this period.

In order to perform such operation automatically upon closure of the stop valve, the device according to the invention preferably includes a timing device arranged to commence operation when, after closure of the stop valve, the metering piston or its equivalent is at a predetermined point near the beginning of its stroke and which is either arranged to determine, at the end of a fixed period of time, the displacement of the piston from the said position or alternatively is arranged to measure the length of time required for movement of the piston from this position to a second position at a predetermined distance therefrom. The latter form of timing device is at present preferred when remote indication is required.

The valve seat may be arranged in line with the fluid passage so that, when the valve is closed, the flow is diverted to a cylinder which is laterally displaced from the fluid passage, the cylinder may alternatively be arranged in line with the fluid passage and substantially co-axial therewith, a normally open by-pass round the piston being provided by apertures or sets of apertures in the wall of the cylinder at both sides of the piston, and outside that length of the cylinder wall with which the piston co-operates during its stroke, a continuation of the passage round the piston being provided by a shell whose two ends sealingly embrace the part in question of the cylinder so as to normally provide an annular duct portion encircling the cylinder and interconnecting the two apertures or sets of apertures, this shell being longitudinally slidable from this normal position to a measuring position in which an extension of the shell blanks off one of the apertures or sets of apertures.

In order that the invention may be more readily understood, various embodiments will now be described in more detail with reference to the accompanying drawings, in which FIGURE 1 shows one form of apparatus with its hydraulic part shown in sectional elevation.

FIGURE 2 illustrates a variation in which a number of identical hydraulic units co-operate with a single recording instrument through a selector switch, modification being indicated in one of the hydraulic units.

FIGURE 3 illustrates a modification of the selector switch arrangement of FIGURE 2.

FIGURE 4 is a diagrammatic elevation of another form of apparatus according to the invention in axial section.

FIGURE 5 is a fragmentary view thereof, showing the control shell in the leak-flow measuring position, and FIGURE 6 is a diagrammatic side-elevation showing apparatus of the kind shown in FIGURES 4 and 5 as part of a system according to the invention.

Figure 1:
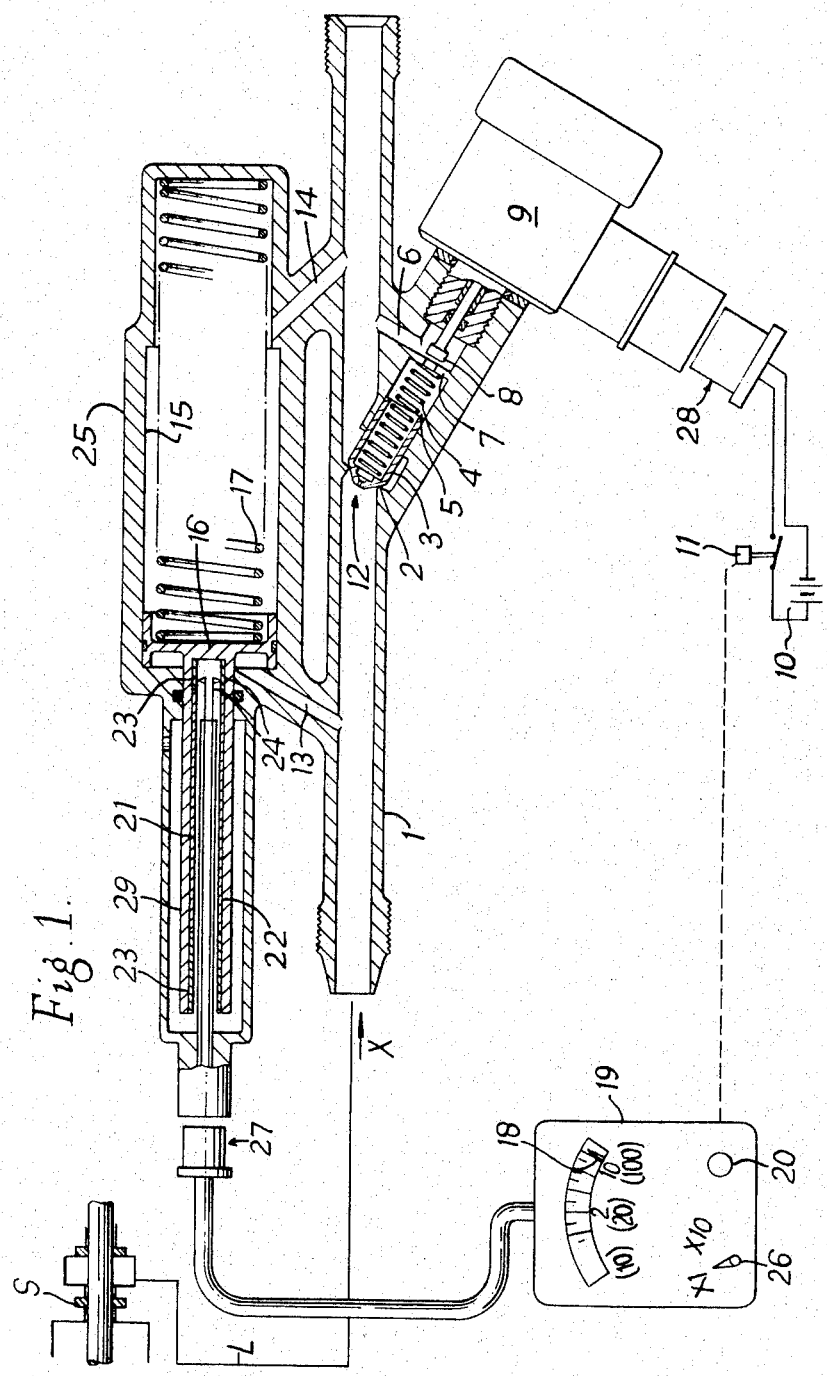

Referring now first to FIGURE 1, the illustrated hydraulic unit includes a section 1 of a pipe line L through which flow from the low-pressure side of a gland seal S normally returns in the direction of the arrow X to a sump or equivalent sink. This line section 1 is formed with a valve seat 2, which is normally closed by a valve element 3 urged on to the seat by a light spring 4. The valve element 3 is formed as a thimble whose cylindrical wall is a sliding fit in a cylindrical bore 5, and this bore normally communicates by a passage 6 with the pipe 1 downstream of the valve seat 2. In normal operation of the seal S the pressure of the liquid flowing through the section 1 in the direction of arrow X will open the valve element 3 against its light spring 4, very little pressure drop across the valve seat 2 being involved, in the bypass line, which includes a branch bore 5. In order to allow the leak flow from the gland seal S to be measured, a valve seat 7, controlling communication between the bore 5 and a passage 6 leading to the line section 1 downstream of the valve seat 2, co-operates with a valve element 8 which is moved by a solenoid 9 to cut off this communication when the solenoid is energised from an electrical source 10, for example from the aircraft battery, under control of a switch 11. The end face of the valve element 3 is provided with a restricted through bore orifice 12, and when the valve element 8 closes its seat 7, the static pressure at the two sides of the valve element 3 becomes equal due to the provision of the orifice 12, so that the spring 4 is then enabled to close the valve 3, with the orifice 12 permitting the chamber 5 to fill with liquid as its capacity increases during this movement of the valve 3. The valve seat 2 is by-passed by a branch of the pipe line section 1, this branch being constituted by two ducts 13 and 14 communicating with the pipe 1 respectively upstream and downstream of the valve seat 2 and respectively connected to the two ends of a cylinder bore 15 in which a piston 16 is slidable, a spring 17 being provided which normally holds the piston 16 at the end of cylinder 15 adjacent to duct 13. It will be readily appreciated that, as soon as the valve 3 is closed, with the gland seal S pressurized, the piston 16 will move towards the opposite end of the cylinder 15 at a rate which is determined by the rate of leakage past the gland S.

In the embodiment illustrated in FIGURE 1 this rate is determined by a recording instrument 19 having a pointer 18 which is normally at the right-hand end of the scale and is arranged to travel at a known, constant rate along the scale, after the valve 3 has been closed, while the piston 16 moves from one to the other of two predetermined points of its travel. For this purpose the recording device is equipped with a start button 20 which, when pressed, energises the switch 11, thus causing the valve 3 to close, and at the same time energising a circuit for causing the pointer 18 to move uniformly along the scale. The piston 16 has an extension 29 equipped with a pair of contact strips 21 and 22 aligned with insulating strips 23 at each end, and these contact strips co-operate with stationary wiper contacts 24 in a housing 25. This co-operation of the wiper contacts 24 with the contact strips 21 and 22 is arranged to complete the circuit for the movement of the pointer 18 as soon as the piston 16 has travelled a short distance from its normal position sufficient for the valve 3 to reach its condition of complete closure, and to break the circuit when the piston 16 has travelled a predetermined distance from this position. The total movement of the pointer 18 from its right-hand initial position is therefore proportional to the time taken by the piston to travel over this distance, and is thus inversely proportional to the rate of leakage flow. The illustrated recording instrument 19 is therefore equipped with a reciprocal scale, the reading on which will give a direct indication of the rate of leakage flow.

In order to permit use over a wide range of leakage-flow rates, the recording device 19 is preferably equipped with a change-over switch 26 which, when moved from the illustrated position to the position marked 10, increases the rate of pointer movement tenfold, thus making it possible to obtain a leakage-rate reading of good accuracy for comparatively high rates of flow.

In the illustrated embodiment plug-and-socket connectors 27 and 28 are provided between the sealing gland or other hydraulic unit on the one hand and the source of electricity and the recording instrument on the other, thus enabling one and the same recording instrument and source of electricity to be employed for obtaining successive recordings of the leakage flow through a number of devices.

FIGURE 2 illustrates a modified arrangement in which a number of leakage-flow metering hydraulic units 30, 31 and 32 are permanently wired to a single selector unit 33 which itself is permanently connected to the power supply 34 of an aircraft and which is equipped with a socket outlet 35 for connection to a recording instrument 36 which is similar to the unit 19 of FIGURE 1, and which may constitute ground equipment. A selector switch 37 on panel 33 is arranged to connect selectively the electric terminals of any one of three leak-flow metering units 30, 31 and 32 to the needle-control circuit of instrument 36 and, via switch 20 of that panel, to the power supply 34. A cable 38 is provided to connect a socket 35 of the selector unit 33 with the recording instrument 36, which may constitute ground equipment. This cable need only contain four leads, but a separate selector unit is required for each aircraft.

FIGURE 5 illustrates a modified arrangement in which the ground unit shown at 39 includes not only the recording instrument but also the selector switch system at 40, thus avoiding the necessity of equipping each aircraft with a selector switch. The place of this switch in the aircraft is taken in this case by a connector unit 41 whose socket 42 includes contacts for all the connections from the individual apparatus 30, 31 etc. and for the electric power from the aircraft power supply 34.

In all embodiments operation of the start button 20 is arranged to effect return of the pointer to its zero mark prior to the starting of the timed pointer movement.

The apparatus illustrated in FIGURES 4 and 5 includes a length of duct 51 which is included, similarly to duct 1 if FIGURE 1, in the return flow line from the low pressure side of a seal to be tested. Included in this length is a hydraulic cylinder having a bore 65 in which a piston 66 is slidable, and a stem 76 of the piston 66, is, similarly to the construction of FIGURE 1, equipped with contact strips 71 and 72 which co-operate with stationary wipers 74 to allow the momentary position of the piston 66 to be electrically ascertained when the piston is displaced by the leakage flow, a timing device being arranged to start operating in one position and stop operating in a second position of the piston. A light spring 67 is provided to normally retain the piston in its illustrated starting position, and in order to normally allow the flow in line 51 to by-pass the piston 66, the wall 75 of the cylinder bore 65 has two axially spaced sets of apertures 63 and 64, and a shell 48 encircling the wall portion 75, slidingly and sealingly co-operates at its ends with the wall of cylindrical duct portions 46 and 47 of the duct. Between the sliding seals the shell 48 has a bore sufficiently greater than the outside diameter of the cylinder wall portion 75 to provide an annular passage of adequate cross-sectional area for the normal flow in the line 51. One of the end portions of the shell 48 is arranged to form a seal with the duct portion 47 over a length sufficient to allow the shell 48 to be displaced from the illustrated normal position to a leak-flow measuring position in which an internal sealing shoulder 49 of the shell isolates one set of ports 64 from the above-mentioned annular passage, which still communicates with the other set of ports 63.

It will thus be appreciated that all that is necessary, in order to measure the leakage flow, is to displace the sleeve 48 to the left of FIGURE 4 to the position shown in FIGURE 5 so as to blank off the port 64, thus forcing the leak flow in line 51 to displace piston 66 against the resistance of spring 67, whereupon the timing device in conjunction wtih the contact strips 71 will provide an indication of the rate of leakage flow.

FIGURE 6, in which the same references are used for the same elements, shows the apparatus of FIGURES 4 and 5 when applied to a ram cylinder 80, in whose return line 81 the apparatus is installed, the combined timing and indicator device being shown at 69.

Various other modifications of the apparatus as described with reference to the drawings are possible without departing from the basic scope of the invention. Thus as indicated in the case of unit 30 in FIGURE 2, the housing 25 of the unit may be provided with a window 43 through which a mark 44 on the piston 16 is visible, and which has a linear graduated scale as indicated, while the unit 36 is in this case constructed as a simple switch which closes the circuit for the solenoid 9 of the selected apparatus for a predetermined time beginning at the moment when wipers 24 reach the contact strips 21, 22, so that the distance by which the pointer 44 moves from the zero mark before its movement is terminated by cessation of the energising current, is proportional to the rate of leakage flow. The rate-selector switch 26 may in this case also be employed to reduce the period of time to one tenth of its normal period when the rate of leakage flow is very high, thus increasing the range of availability of the instrument, and the device can be used for checking many kinds of sliding seals, including sliding pistons as well as shaft seals both of the rotary and of the longitudinally sliding kind.

What we claim is:

1. A checking device for hydraulic apparatus having a seal and an outlet for leak flow from the seal, the device comprising a line section having an inlet and an outlet, means for connecting said inlet to the leak flow outlet of such apparatus, a metering branch passage leading from the inlet to the outlet of the line section, a partition in said metering passage dividing said passage into two sections respectively communicating with said inlet and said outlet, said partition being sealingly movable past a first position to a second position spaced from said first position along said passage, a stop valve arrangement in said line section operable to prevent flow through the line section, conductor members, a set of fixed wiper members for co-operation with said conductor members, said wiper and conductor members being movable relative to each other in accordance with the relative movements of said passage and partition in such manner that said conductor and wiper members will during the movement of the partition respectively make mutual contact and break such contact as the partition reaches said first and second position in the metering passage, a timing device having an indicator needle movable at constant speed over a graduated scale from a starting position, and means operable by the making and breaking of such contact to respectively start and terminate such movement of the needle, and the scale being graduated to give, at the end of such movement, a direct indication of the rate of leak flow.

2. Apparatus as claimed in claim 1 including a spring operable to return the partition to an initial position adjacent the inlet when the stop valve is open.

References Cited

UNITED STATES PATENTS

| | | | |
|---|---|---|---|
| 3,090,221 | 5/1963 | Crosby | 73—40 |
| 3,092,821 | 6/1963 | Muehlner | 73—40 X |
| 3,176,503 | 4/1965 | Robinson | 73—40 |
| 3,233,447 | 2/1966 | Horrell | 73—46 |
| 2,892,346 | 6/1959 | Sargent | 73—194 |

OTHER REFERENCES

Leakmeter Model 400—brochure by Convair, Instruments, Division of General Dynamics, 3595 Frontier St., San Diego, Calif., August 1960—5 pages.

LOUIS R. PRINCE, *Primary Examiner.*

J. NOLTON, *Assistant Examiner.*